United States Patent [19]

Warner

[11] Patent Number: 5,182,975
[45] Date of Patent: Feb. 2, 1993

[54] GUIDE FOR PORTABLE POWER SAW

[76] Inventor: John L. Warner, 2 Vining Dr., Simsbury, Conn. 06070

[21] Appl. No.: 692,227

[22] Filed: Apr. 26, 1991

[51] Int. Cl.⁵ .............................................. B27B 9/04
[52] U.S. Cl. ...................................... 83/745; 83/574; 83/455; 33/479
[58] Field of Search ................. 83/744, 745, 574, 454, 83/455, 522.25; 24/67.3, 67.7, 67.9, 67.11; 33/568, 569, 570, 633, 42, 479, 480; 269/254 D

[56] References Cited

U.S. PATENT DOCUMENTS

| | | | |
|---|---|---|---|
| 460,754 | 10/1891 | Moxley | 24/67.7 |
| 782,476 | 2/1905 | Winters | 24/67.7 |
| 1,428,900 | 9/1922 | Oppenheimer | 24/67.11 |
| 1,637,485 | 8/1927 | Hiering | 24/67.9 |
| 4,056,028 | 11/1977 | Patterson | 83/745 |
| 4,202,233 | 5/1980 | Larson | 83/574 X |
| 4,306,479 | 12/1981 | Eberhardt | 33/479 X |

Primary Examiner—Douglas D. Watts
Assistant Examiner—Clark F. Dexter
Attorney, Agent, or Firm—Charles R. Fay; Munson H. Lane, Jr.

[57] ABSTRACT

A guide for a hand-manipulated power saw having a main support plate, the guide having a sole plate with a saw-guiding edge, and a gauge bar clamp on the sole plate at the bottom surface thereof at right angles to the guiding edge, the clamp having a resilient member spaced from the bottom surface of the sole piece to hold a gauge bar or rod directly against the work-piece.

The invention includes two forms, one in which the clamp is integral with the sole plate and thus fixed in relation to the saw guiding edge, and a form in which the clamp is detachable and adjustable relative to the saw guiding edge, the clamp in this case being under the sole plate so that the gauge bar is also located under the sole plate in use.

8 Claims, 1 Drawing Sheet

GUIDE FOR PORTABLE POWER SAW

BACKGROUND OF THE INVENTION

This invention is an improvement over Patterson U.S. Pat. No. 4,056,028, Nov. 1, 1977. The present applicant has done away with the manually operable means in the patent to clamp the removable rod, strip or bar, the end of which indicates the line of cut of a workpiece, i.e. a board, stringer, rafter, etc. At the same time the point of the saw line is indicated more exactly as the gauge bar in the present invention rides directly on the edge of the work-piece, and is not separated therefrom, as in the patent, by a part of the bar holding element. Also, the gauge bar clamp is made so that the bar is applied to the guide and adjusted thereon in a quicker, easier manner.

In addition, the new guide is capable of being molded in one piece or more conveniently in two pieces, of plastic material, and the present guide is therefore less expensive to make. In making the guide in two pieces, which are the main body or saw guiding member and the gauge bar holding part, the two parts can be adhesively joined as for the normal position, or bolted together for an angular adjustment of these parts.

SUMMARY OF THE DISCLOSURE

A guide for a portable power saw comprising a generally flat, stiff base which has a straight line edge that actually guides the portable saw in its cutting action is provided. This base or sole plate is made of any suitable material but most conveniently it is molded of a suitable plastic. A forward edge at a right angle to the saw guiding edge is provided with means to resiliently hold a gauge bar at the same right angle. This holding or clamping means is also of molded plastic but in a channel shape, one leg of which is integral with or is adhesively secured to the lower or bottom face of the base. The opening between the legs of the channel-shaped clamping member faces rearwardly or toward the main part or base of the device. The other leg of the channel is free of the base otherwise, and is inherently springy to resiliently hold a rod, stick or bar of cross-sectional dimensions to fit the channel clamp and to, by yielding, be held in fixed position therein. The rod, stick or bar is easily adjusted longitudinally in the channel clamp, but once located correctly, indicates a length of work that is to be cut and the rod, stick or bar directly impinges on the work piece, so that accuracy is improved.

By securing the separate channel clamp to the base by a single swivel bolt, an angularly adjustable clamp may be made.

PREFERRED FORMS OF THE INVENTION

Figure 1:
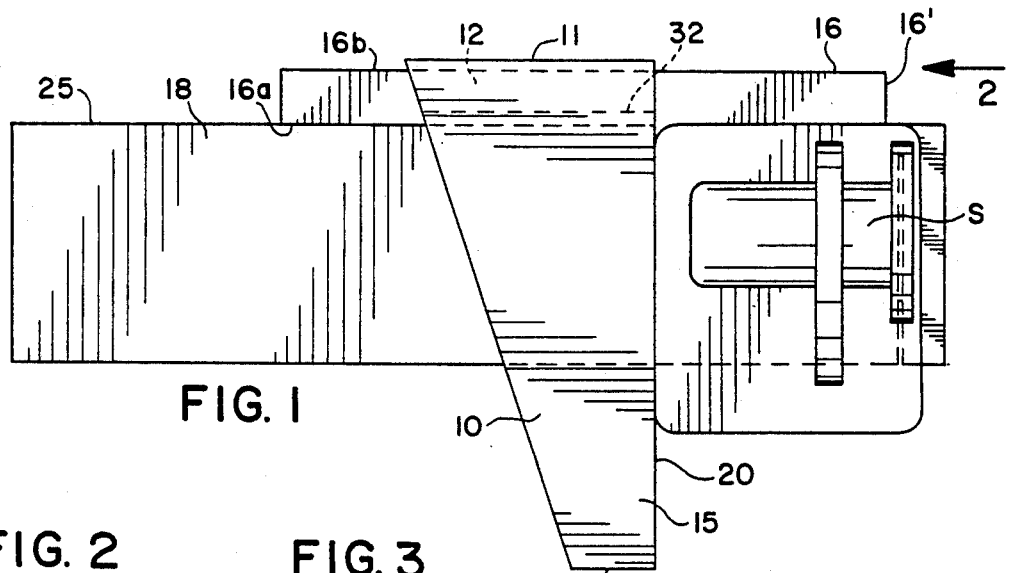
FIG. 1 is a plan view of a form of the invention.

This invention is useful in many kinds of measuring and marking, but is mostly used to guide the cutting stroke of a hand manipulated power saw S, as seen in FIG. 1. It comprises a sole plate 10 having a gauge bar 16 clamped by means of a resilient clamp member 12 that is located along the forward edge 11 of plate 10 and extends rearwardly from the forward edge of the plate under the same and spaced from the plate bottom surface 14, see FIG. 2. The resilient clamp member 12 slants slightly toward the plate 10 and clamps the gauge bar or the like 16 to the bottom surface 14 thereof to frictionally hold the gauge bar in a selectively axial adjusted position. This gauge bar is wider than the clamp member 12 and directly contacts an edge 25 of the work piece 18 to indicate where the guide should be placed to make the desired cut by sliding saw S along the side edge 20 of the plate 10.

The straight side edge 20 of the sole plate 10 extends between the opposite ends 11 and 13 of the sole plate. The bottom surface 14 of the sole plate is substantially flat for contact with the work piece 18. The saw guiding edge 20 extends between the bottom surface 14 and upper surface 15 of the sole plate at a right angle to the bottom surface.

Figure 2:
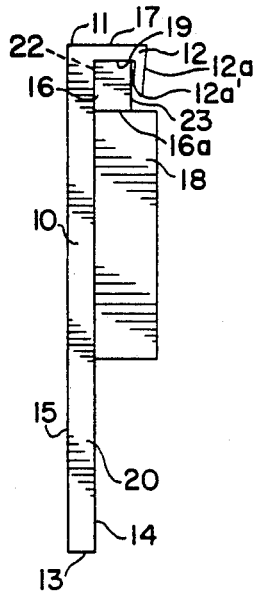
FIG. 2 is an end view of FIG. 1, looking in the direction of the arrow 2 in FIG. 1, omitting the saw.

The gauge bar 16 is an elongated rigid member of rectangular cross section as seen in FIG. 2 with parallel inner and outer edges 16a and 16b respectively. The width of the gauge bar 16 between edges 16a and 16b is sufficient so that the inner edge 16a contacts the edge 25 of the work piece without interference from the clamping member 12. The length of the gauge bar 16 is substantially longer than the length of the edge 11 of the sole plate so that one end from the sole plate a predetermined distance to provide a gauge marking for the desired saw cut to be made across the work piece 18.

Figure 3:
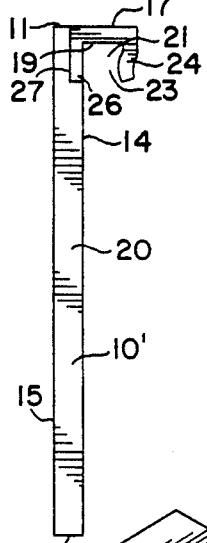
FIG. 3 is a view similar to FIG. 2, showing a modification.

The resilient clamp 12 provided along the forward edge 11 of the sole plate 10 may be formed in different ways, as will be subsequently described. It basically is an open ended U-shaped channel having a base or connecting portion 17 and a pair of spaced legs extending in the same direction from the connecting base portion and forming between them an open ended slot 21 in which the gauge bar is held. One of the legs, herein referred to as an upper leg, is either the sole plate 10, as shown in FIG. 2, or a leg of a channel member formed separately from the sole plate as shown in FIG. 3. The other, or lower leg, 12a slants toward the sole plate from the base portion 17 and is resiliently yieldable outwardly from the sole plate to receive the gauge bar 16 within the slot 21 and to hold the gauge bar tightly between the upper and lower legs with the inner edge 16a of the gauge bar spaced outwardly from the free edge 12a' of the lower leg through the open face 23 of slot 21. The inner surface 19 of the base portion 17 is a straight flat surface normal to the bottom surface 14 of the sole plate, The inner surface 19 provides a flat contact surface for the outer edge 16b of the gauge bar 16.

The clamp may be molded integrally with the plate 10 or molded separately and bolted, screwed, or adhesively secured as along the surface indicated by the dotted line 22, or some other configuration may be used, as in FIG. 3, which shows a U-shaped clamping member having a leg 26 inset into the plate 10' and a second leg 24 spaced outwardly from the leg 26. The rest of the guide is the same as in FIGS. 1 and 2.

Figure 5:
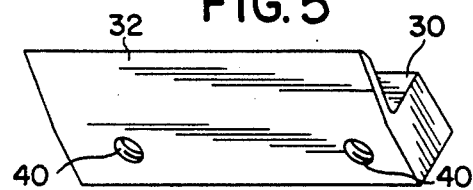
FIGS. 5 and 6 are perspective views of the gauge bar holder of FIG. 4.
Figure 6:
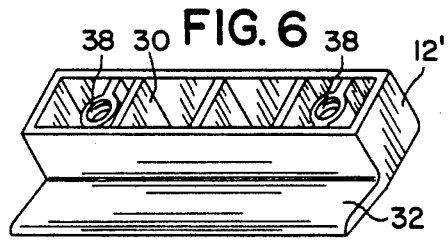
Figure 4:
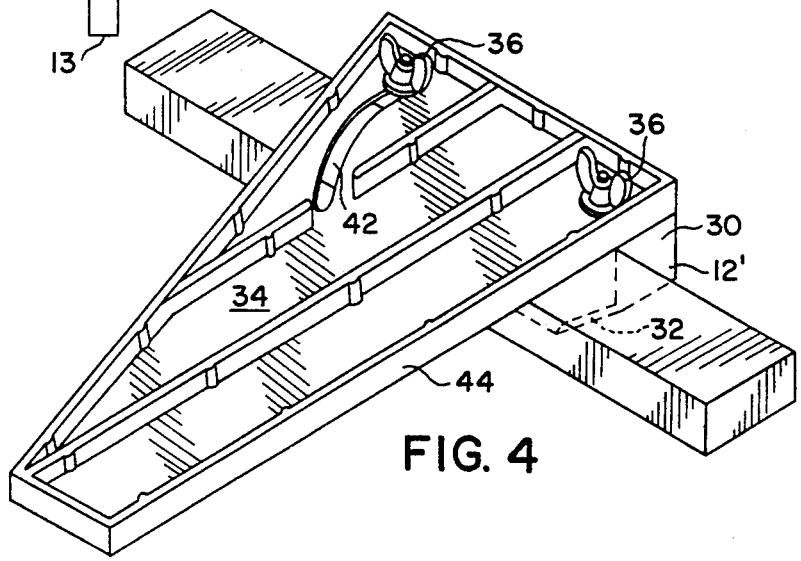
FIGS. 4 is a perspective view of another modification.

A way to bolt the two separate parts is shown in FIGS. 4, 5 and 6 wherein the clamping part 12' comprises an oblong box base portion 30 open along one side only and having a resilient lip or the like 32 which is equivalent of the lower leg 12a or clamp part of FIG. 2, angling in slightly to provide the gauge bar clamp. This box like member may be secured to the plate 34 as by thumb screws 36 extending through the plate 34 near the front edge and received in interiorly threaded holes 40 in the columns 38 located in the hollow interior of the box like member 30. As seen in FIG. 4 the thumb screw 36 located in the right hand corner of the plate 34 provides a corner pivot permitting the clamping part 12' to rotate relative to the plate 34 when the thumb screws are loosened. A curved slot 42 in the plate 34 through which the other thumb screw 36 extends provides for limited angular adjustment of the clamping part 12' relative to the plate 34. The clamping part 12' may be selectively adjusted from a right angle relationship with the saw guiding edge 44 of the plate 34 (see FIG. 4) to any angle within the limits set by the curved slot 42 by loosening the thumb screws 36, rotating the clamping part 12' about the corner pivot to a selected angular position and retightening the thumb screws.

Among the advantages is the fact that the free end of the gauge bar may be cut off exactly at the point the user wants to saw the work, so that thereafter the bar indicates exactly where the ensuing cuts are to take place.

I claim:

1. Saw guide apparatus comprising a sole plate for disposition on top of a work-piece, said sole plate having opposite ends and a straight saw guiding edge on the sole plate between said opposite ends, an elongated, rigid, rectangularly cross sectioned, parallel sided gauge bar, a resilient bar clamp on the sole plate at an angle to the saw guiding edge, the sole plate having a substantially flat bottom surface for contact with the work-piece and an upper surface, the saw guiding edge extending between said bottom and upper surfaces at a right angle to said bottom surface and the clamp extending downwardly from the bottom surface away from said upper surface and located at one end of said sole plate, said clamp being generally U-shaped having an upper leg formed at least in part by said bottom surface of said sole plate, a lower leg having a free edge extending along its length, and a straight base portion between said upper and lower legs, said said straight base portion extending downwardly from said sole plate and having a straight flat surface located between said upper and lower legs which is normal to said bottom surface of said sole plate, said lower leg being resilient and angled with respect to said base portion to underlie the sole plate, said upper and lower legs together with said base portion forming between them an elongated open ended slot having an opening opposite said base portion, said elongated, rigid, rectangularly cross sectioned gauge bar being frictionally held within said elongated open ended slot with one side of said bar contiguous with said straight flat surface of said base portion and another side of said bar forcing said second leg to resiliently deflect downwardly, said bar being of a length substantially longer than said slot and having one end extending outwardly from one end of said slot across said saw guiding edge, so that the end of said bar extending across said saw guiding edge is a precise distance from said saw guiding edge, the width of said bar being greater than the distance between said free edge of said lower leg and said base portion of said clamp so that the side of said bar opposite to the side held contiguous to said straight flat surface of said base portion is located beyond the free edge of the lower leg of said clamp whereby it may directly contact a side edge of the work-piece on which the sole plate is adapted to be disposed, said lower leg being slanted toward said sole plate and being resiliently yieldable away from said sole plate when said gauge bar is positioned within said slot to firmly secure the gauge bar in said slot.

2. The apparatus of claim 1 wherein the sole plate and the resilient bar clamp are integral.

3. The apparatus of claim 1 wherein the sole plate and the resilient bar clamp are separate, and means securing the bar clamp to said sole plate.

4. The apparatus of claim 3 wherein the bottom surface of the sole plate is recessed adjacent to said one end on which the clamp is located, said upper leg of said clamp being secured in said recess and forming an extension of said bottom surface.

5. The apparatus of claim 3 wherein said base portion and lower leg of said clamp are integral and are separable from said sole plate.

6. The apparatus of claim 5 together with means pivotally connecting the integral base portion and lower leg to said sole plate and with means for selectively adjusting the angular position of said integral base portion and lower leg relative to said saw guiding edge.

7. The apparatus of claim 6 wherein said means pivotally connecting the integral base portion and lower leg to said sole plate includes a pivot extending through said sole plate and into the base portion, said pivot being normal to the bottom surface of said sole plate.

8. The apparatus of claim 6 wherein said means for selectively adjusting the angular position of said integral base portion and said lower leg relative to said saw guiding edge includes an arcuate slot formed in said sole plate with its center of curvature being the pivot axis of said means pivotally connecting the integral base portion and lower leg to said sole plate, a bolt secured in said base plate and extending upwardly through said arcuate slot, means secured to said bolt for tightening the base portion against the bottom surface of said sole plate in a selected angular position of said integral base portion and lower leg relative to said sole plate.

* * * * *